Oct. 24, 1961 S. BARTNOFF 3,005,766

THERMOELECTRIC SYSTEMS

Filed Sept. 27, 1957 4 Sheets-Sheet 1

INVENTOR
Shepard Bartnoff
BY
Donald J. Smith
ATTORNEY

Oct. 24, 1961 S. BARTNOFF 3,005,766

THERMOELECTRIC SYSTEMS

Filed Sept. 27, 1957 4 Sheets-Sheet 2

Oct. 24, 1961 S. BARTNOFF 3,005,766

THERMOELECTRIC SYSTEMS

Filed Sept. 27, 1957 4 Sheets-Sheet 4

United States Patent Office 3,005,766

Patented Oct. 24, 1961

3,005,766

THERMOELECTRIC SYSTEMS

Shepard Bartnoff, Pittsburgh, Pa., assignor to Westinghouse Electric Corporation, East Pittsburgh, Pa., a corporation of Pennsylvania Filed Sept. 27, 1957, Ser. No. 686,780
5 Claims. (Cl. 204—193.2)

The present invention relates to systems for the direct conversion of heat into electrical energy and particularly to systems of the character described adapted for use in conjunction with a nuclear power plant or other centralized source of heat.

Numerous schemes have been proposed heretofore for converting heat or other forms of radiant energy directly into electrical power. Such schemes frequently attempted to utilize the well-known Seebeck or thermocouple effect whereby an electric current is generated by maintaining the junctions of the thermocouple at relatively different temperatures. A large number of such thermocouples may be connected into an arrangement wherein some of their junctions are maintained at a lower temperature and the remaining junctions thereof at a higher temperature. In this manner, attempts have been made to assemble large numbers of segments of the dissimilar materials comprising the thermocouple into a so-called thermopile by joining the dissimilar segments in alternation to comprise the hot and cold junctions thereof. Inasmuch as the electrical output from a single thermocouple is exceedingly small, an inordinate number of such thermocouples, when so assembled, would be required in order to produce a significant amount of electric power. The number of such thermocouples comprising the thermopile can be reduced to a practicable number only by maintaining extreme differences in temperature between the hot and cold junctions of the thermopile in order to generate usable quantities of electrical energy. Moreover, unless the number of individual thermocouples are so reduced, the joule losses in the thermopile, i.e., the irreversible second order current heating losses, renders the thermopile so inefficient as to obviate its practical value. On the other hand, when thermoelectric materials having higher electrical conductivity are employed, the attendant greater thermal conductivity usually associated therewith decreased the available temperature differentials which could be maintained between the hot and cold junctions of the thermopile.

Until the present invention, no workable scheme has been disclosed for arranging a thermopile of the character described such that a significant quantity of electrical energy can be generated therein. Prior schemes have been found to be inadequate due to the difficulty of maintaining a workable and adequate temperature differential between hot and cold junctions of the thermopile. The spatial arrangement of the hot and cold junctions has been complicated by the excessive number of thermocouples which would be required to generate electrical power in usable quantities. As a result, no arrangement has heretofore been proposed for conveniently and adequately segregating the aforesaid hot and cold junctions and for efficiently supplying heat to the hot junctions of the thermopile while cooling the cold junctions thereof. Moreover, the large number of series-connected pairs of the dissimilar materials comprising previously proposed thermopile arrangements would so increase the ohmic resistance thereof that the necessarily increased size of the thermopile, which would be required to compensate this resistance, would render the adequate heating and cooling of the hot and cold junctions, respectively, thereof virtually impossible.

In view of the foregoing it is an object of the invention to provide novel and efficient means for converting heat directly into electricity.

Another objective of the invention is to provide a thermopile arrangement, which can be fabricated and assembled with relative ease and with a minimum of component parts.

Another object of the invention is to provide a novel and efficient thermopile arrangement adapted in one application thereof for use with a source of nuclear power.

A further object of the invention is to provide a thermopile arrangement wherein the hot and cold junctions thereof, respectively, are adapted for being heated and cooled by either gaseous or liquid heat transfer media.

Still another object of the invention is to provide a novel and efficient fuel element adapted for use with a nuclear reactor and having means associated therewith for converting at least part of the heat developed by the chain reaction, which is sustained within the reactor, directly into electricity.

A still further object of the invention is to provide heat exchanging means adapted for the transfer of heat, between liquid, gaseous, and solid materials, or combinations, wherein at least a portion of the heat being transferred is converted directly into electricity.

Yet another object of the invention is to provide a novel and efficient fuel element assembly adapted for use with a nuclear power reactor, which assembly is furnished with means for electrically connecting the component thermoelectric fuel elements thereof into a thermopile arrangement.

These and other objects, features, and advantages of of the invention will be made apparent during the ensuing description of exemplary forms thereof with the description being taken in conjunction with the accompanying drawings wherein.

In accordance with the invention, a thermopile is arranged in conjunction with a plurality of heat exchanging means. More specifically, the segments of dissimilar materials comprising the thermopile are arranged independently upon a like number of the aforesaid heat exchanging means. In one example of the invention, each of the aforesaid segments are disposed in the casing or cladding of a generally tubular heat exchanging element among which suitable electrical connections are provided in order to couple the thermoelectric materials to form a thermopile. In furtherance of this purpose, the individual tubular elements of the thermopile are arranged such that all of the hot junctions thereof will be confined to one surface, for example, the interior surface of the casing, and thus are adapted for heating by a source of heat energy contained within the casing or alternatively by heated fluid media passing therethrough. On the other hand, the cold junctions of the thermopile are confined to the other surface of the tubular casing, that is to say, the outer surfaces thereof, and thus are arranged for convenient cooling by a fluid owing exteriorly of the tubular casings. Therefore, a comparatively large number of the aforesaid tubular casings can be adapted for suspension within an enclosed vessel, for example, and suitable well-known means can be utilized for segregating the coolant passing around the tubes from the source of heat or from the heated fluid contained within or passing through the tubes. Alternatively, the coolant fluid and the source of heat can be segregated by means arranged according to the invention and presently to be described.

In other aspects of the invention, it is contemplated that the aforesaid tubular casings be arranged such that the hot junctions of the thermopile are disposed exteriorly of the casings while the cold junctions are confined to the interior surfaces thereof. In this latter arrangement, the coolant material is accordingly passed through the interior of the tubular casings while the heating material is maintained outside of the tubular casings. As will be shown hereinafter, this latter arrangement is found to be convenient in those applications wherein a smaller quantity of cooling medium is required in comparison with that of the heating medium.

Figures 1, 2, 4, 5, 6, 7:
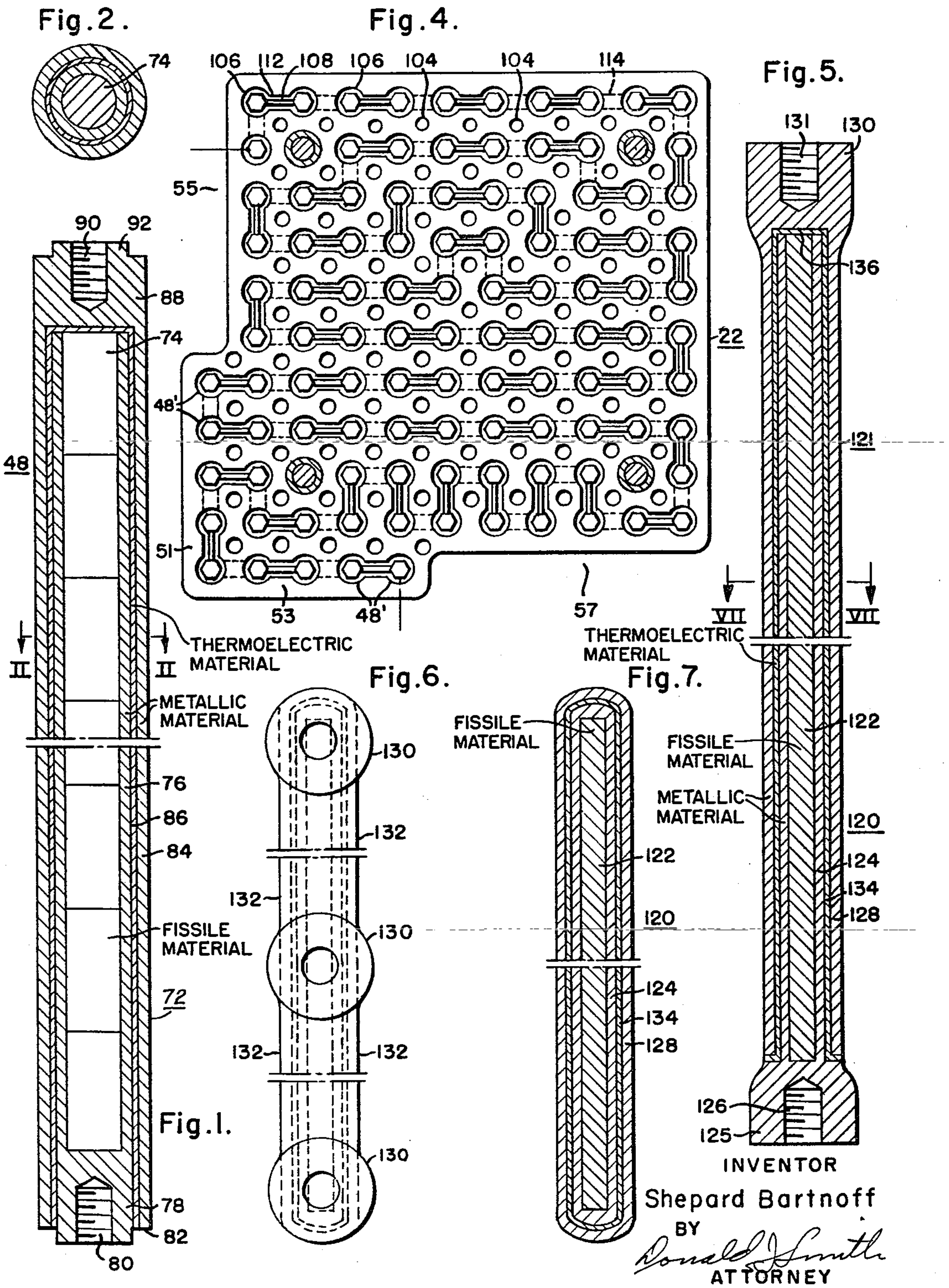
FIGURE 1 is a substantially central longitudinal sectional view of a fuel element adapted for use in conjunction with a nuclear reactor and arranged according to the present invention.
FIG. 2 is a cross-sectional view of the fuel element of FIG. 1 taken along reference lines II—II of FIG. 1.
FIG. 4 is a top plan view of the fuel element bundle forming a part of the assembly of FIG. 3 and taken along reference lines IV—IV thereof.
FIG. 5 is a longitudinally sectional view of another form of nuclear fuel element arranged according to the invention.
FIG. 6 is a top plan view of the fuel element of FIG. 5.
FIG. 7 is a cross-sectional view of the fuel element of FIG. 5 taken along reference lines VII—VII thereof.
Figure 3:
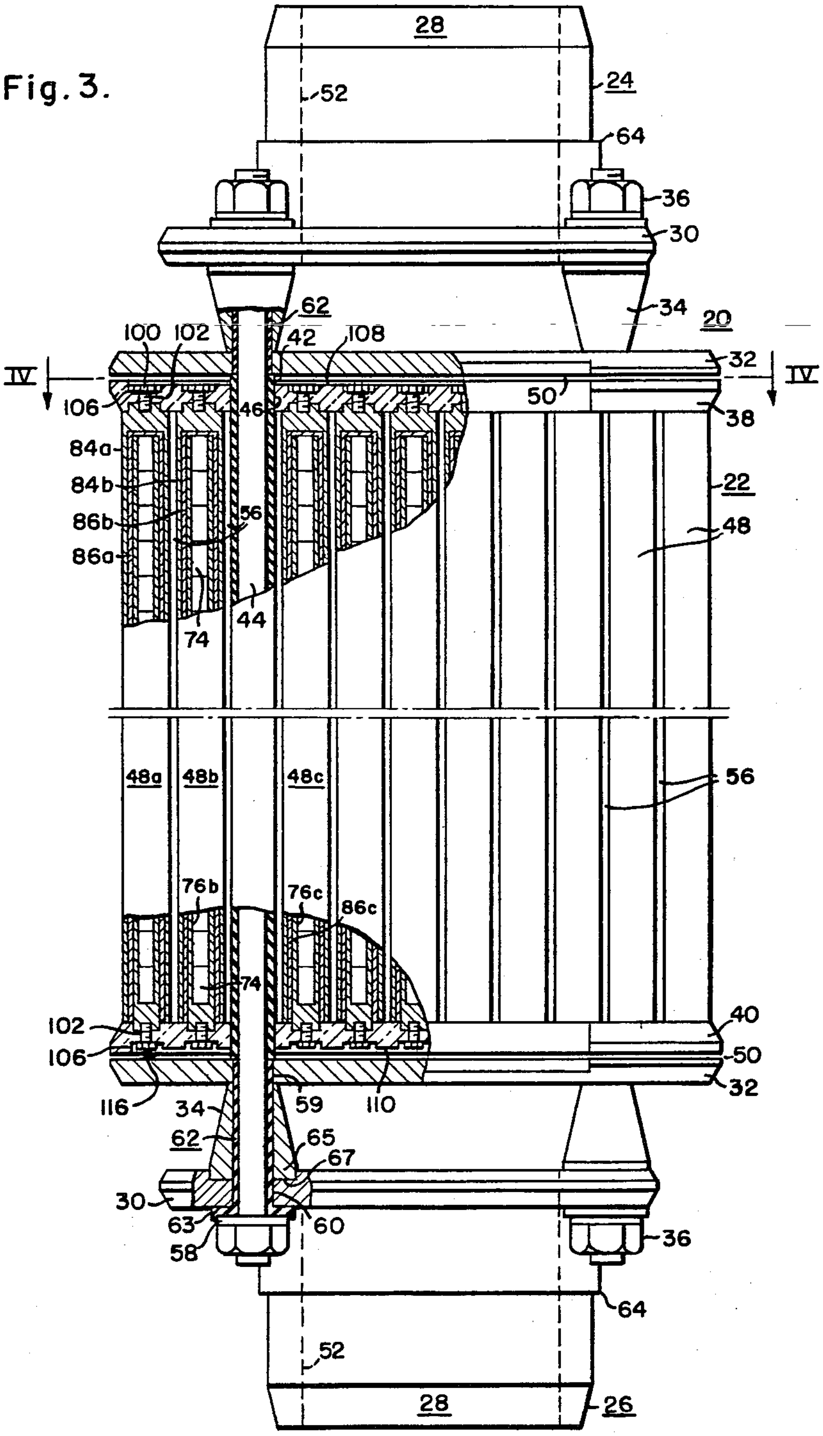
FIG. 3 is an elevational view, partially sectioned, of one form of fuel element assembly adapted for use with a nuclear reactor arranged in accordance with the teachings of the invention.

Referring now more particularly to FIGS. 3 and 4 of the drawings, an exemplary form of the invention as shown therein, is arranged in association with a fuel element assembly 20 which is adapted for suspension in the core (not shown) of a neutronic reactor. In such a reactor, a plurality of fuel element assemblies 20 are employed with each of the assemblies containing a quantity of fissile material, for an example, one of the isotopes U-235, U-233 or Pu-239, or combinations thereof. The number of these fuel element assemblies and the amount of fissile material contained within each are selected such that at least a critical mass of the material, i.e. a quantity sufficient to sustain a nuclear chain reaction therewithin, is contained within the aforesaid neutronic reactor core. Therefore, the size of the core is still somewhat dependent upon the total power level or heat output thereof, and both the total number and size of the fuel element assemblies 20 can be varied within limits to meet the power requirements of a particular neutronic reactor. These and other structural details of a specific embodiment of a neutronic reactor are given in a copending application of Robert J. Creagan, "Neutronic Reactor," Serial No. 686,778, filed September, 27, 1957 and assigned to the assignee of the present application, and accordingly, further elaboration thereon is deemed unnecessary. Moreover, specific details of operational theory of such reactors are set forth in Enrico Fermi and Leo Szilard Patent No. 2,708,656 dated May 17, 1955.

Turning now more specifically to FIGS. 3 and 4 of the drawings, the fuel assembly 20 which is illusrated therein comprises a fuel bundle indicated generally by the reference character 22, to each end of which is secured a flow nozzle assembly 24 or 26, respectively. Each of the flow nozzle assemblies 24 and 26 includes in this example a flanged nozzle 28 and a mounting plate 32. The aforesaid component parts of the nozzle assembly are spaced from one another by a number of spacers 34, with four being employed in this example of the invention.

The pair of mounting plates 32, which are individually arranged at positions adjacent end plates 38 and 40 of the fuel element bundle 22, are each separated by a number of tie rod sleeves 42 passing through the fuel bundle 22 and bearing against the opposing surfaces of the mounting plates 32. For the purpose of electrically insulating the aforesaid mounting plates 32, the tie rod sleeves are fabricated from a ceramic-material such as aluminum oxide. The assembly of the nozzles 28, their associated components, and the fuel element bundle 22 are secured together by means of tie rods 44 inserted individually through each of the aforesaid insulating sleeves 42 and secured to the nozzle assemblies at the respective threaded ends by means of nuts 36. The mounting plates 32 and the remaining components of each flow nozzle assembly 24 or 26 are thus rigidly joined with the mounting plates bearing against the respective ends of the tie rod sleeves 42. In this arrangement then, each of the end plates 38 and 40 of the fuel bundle 22 are more or less slidably mounted upon the tie rod sleeves 42 as a result of the tie rod sleeves having been inserted and fitted relatively closely through an appropriate aperture 46 formed in each of the end plates 38 and 40.

As will be explained hereinafter in greater detail, the fuel bundle 22 is made up of a plurality of fuel elements 48 each of which is formed with a quantity of one or more of the fissile isotopes mentioned heretofore. Accordingly, when an adequate number of fuel element assemblies 20 are arranged within a neutronic reactor for sustaining a chain reaction therewithin, individual fuel elements 48 thereof, which contain the source of the heat output of the reactor will expand accordingly to a greater extent than the component structural parts of the fuel element assembly. For this reason, in order to permit relative expansion between the fuel elements 48 and the component parts of the assembly, gaps 50 are provided initially between the end plates 32, and 38 and 40 of the nozzle assemblies 24 and 26, respectively.

Each of the nozzles 28 is provided with a relatively large opening 52, which provides access and egress, as the case may be, for coolant fluid flowing through the fuel bundle 22 and more specifically through flow passages 56 provided within the fuel bundle 22 between adjacent ones of the fuel elements 48, in a manner presently to be elaborated upon. The flow nozzles 28 are each secured by means of associated flange 30 and the nuts 36 to the tie rods 44, the ends of which are inserted into suitably disposed apertures 60 of the flange 30. Each flow nozzle 28 is further provided with a circumferentially projecting shoulder 64 which is arranged to engage the inner surface of the top and bottom supporting plates (not shown) of a reactor core, whereby the tubular end portions 66 of the nozzle 28 can be inserted into suitably spaced and aligned apertures formed respectively in the aforesaid supporting plates and thus the fuel element assembly 20 is suspended and positioned within the reactor core. The arrangement of fuel element assemblies 20 with a reactor core, in this fashion, is shown in detail in the aforesaid copending application of Robert J. Creagan, and also in a copending application of William E. Shoupp, "Electric Generating Systems," Serial No. 686,777, filed September 27, 1957, and assigned to the assignee of the present application.

As shown more fully in FIG. 4 of the drawings, the fuel bundle 22 is formed with stepped portions 51 and 53 on adjacent sides thereof. These stepped portions are disposed thusly to form channels 55 and 57 between adjacent closely spaced fuel element assemblies 20 for the insertion of control rods as described in the aforesaid copending applications. Additional fuel elements 48' are mounted at the stepped portions in order to eliminate vacancies at these points within the fuel assembly 20. Otherwise these vacancies would induce neutronic flux peaking thereat due to an excess of coolant-moderator.

The flow nozzle with its flange 30 and mounting plate 32 are insulated from the tie rods 44 in this example, by means of an elongated bushing 62 fabricated from an electrically insulating material such as one of the ceramics mentioned heretofore. The flange portion 63 of the bushing then operates to insulate electrically the nut 36 and associated washer 58 and tie rod 44 from the nozzle flange 30. Similarly, the inward sleeve portion 59 of the insulating bushing 62, which for ease of fabrication, can be furnished in two or more parts if desired, operates to insulate the mounting plate 32 from the tie rods 44 passing therethrough.

Each flow nozzle 28 is positioned precisely relative to the fuel bundle 22 and tie rods 44 by the insertion of the outward end portion 65 of the spacing members 34 into complementing recesses 67 formed in the interior surface of the nozzle 30 and surrounding each aperture 60 thereof. The tie rod sleeves 42 are relatively thicker than the adjacent end portions of the bushings 62 in order that the ends of these sleeves will bearingly engage the inward surfaces of the mounting plates 32 to maintain the desired spacing therebetween.

As indicated heretofore, the fuel bundle 22 of the assembly 20 comprises a plurality of the fuel elements 48 of which in this application of the invention, 105 are employed and which have been described in greater detail in connection with FIGS. 1 and 2 of the drawings. Each of the fuel elements 48 are provided in a manner presently to be described with a thermoelectric material and the assembly 20 (FIGS. 3 and 4) is arranged with conductive means for coupling the respective hot and cold junctions of the thermoelectric materials. A thermoelectric material is disposed in or forms part of the casing or cladding with which each portion of the fissile isotopes, confined within the reactor, is surrounded and which serves to prevent the accumulation of radioactive fission products within the coolant circulated by a suitable pump through the reactor. This cladding material which can be zirconium, one of its alloys, stainless steel, aluminum or the like, depending upon the operating temperature of the reactor additionally serves in some instances to prevent corrosion of the fissile material.

In this example of the invention, then, the fuel element 48 comprises a casing indicated generally by the reference character 72 and a plurality of pellets or segments 74 containing one of the fissile isotopes mentioned previously. For relatively high operating temperatures, the isotope is provided in the form of its pulverulent oxide, for example, $UO_2$ and is pressed to form a pellet having a density approaching the theoretical value of the aforesaid oxide. In this arrangement of the invention each of the fuel elements 48 is generally rod shaped and accordingly, the fuel pellets 74 are of cylindrical configuration. In one example, the fuel pellets are each 300 mils in diameter and may vary between approximately ½ and 3 inches in length or more depending upon the handling characteristics desired therefor and upon the availability of suitable pressing and sintering techniques, for imparting a uniform consistency to the fuel pellet. The fuel pellets 74 are provided substantially along the entire length of each of the fuel elements 48, which elements as pointed out in the aforesaid Creagan application, may be in the neighborhood of 100 inches in length.

Immediately surrounding all of the fuel pellets 74 is an inner cladding layer 76 which terminates adjacent the lower extremity of the fuel element 48 in a thickened end or block portion 78. The block portion 78 is provided with a centrally extending tapped hole 80 and the surrounding area 82 of the block portion 78, for purposes presently to be described, projects a short distance beyond the ends of adjacent components of the fuel element 48 to aid in mounting the fuel element in the fuel bundle 22 of the assembly 20. The fuel pellets 74 also are surrounded by an outer cladding layer 84 which is spaced from the aforesaid inner cladding layer 76 by an intervening layer 86 of a thermoelectric material. The thermoelectric layer 86 extends substantially continuously between the aforementioned inner and outer cladding layers 76 and 84, respectively, and thus maintains these latter-mentioned layers in their spaced relationship, whereby direct electrical contact therebetween is prevented.

The inner cladding layer 76, in one example of the invention, is provided in the form of a tubular member into which the fuel pellets 74 are inserted. The thermoelectric layer 86 presently to be described, is then deposited thereon in a convenient manner, for an example, by spraying, electrical or chemical plating, or coextrusion, and the assembly thus formed then is inserted into the outer cladding layer 84 which is likewise formed into a tubular casing. The outer cladding layer 84 likewise terminates at the upper extremity of the fuel element 48 in a thickened end or block portion 88, provided also with a centrally extending tapped hole 90 and a co-extending annular projection 92, likewise employed for mounting the fuel element 48 within the bundle 22, as presently will be described. It will be appreciated that each of the inner and outer cladding layers 76 and 84 likewise can be coated directly on the fuel element 48 as by hot rolling, flame spraying, plating, co-extrusion or the like. In one illustrative arrangement of the fuel element 48, each of the cladding layers 76 and 84 is provided with a thickness of approximately 7 to 15 mils, while the thermoelectric layer 86, when certain materials are used as indicated hereinafter, can be provided with a thickness of 5 to 10 mils.

In this arrangement of the invention as described heretofore, the dissimilar thermoelectric materials are selected desirably but not necessarily from a group of mixed valence inorganic compounds such as those described in a copending application of Robert R. Heikes and William D. Johnston, entitled "Thermo Elements and Devices Embodying Them," filed April 16, 1957, Serial No. 653,245, now Patent No. 2,921,973, and assigned to the present assignee, and specific reference is made to said application for the materials disclosed therein. As stated in the latter-mentioned application, one group of these mixed valence compounds has the general formula $Li_mT_{(1-m)}X$, where T represents at least one transition metal from the group including manganese, iron, nickel, cobalt, copper, and zinc, X represents a chalcogenide selected from the group comprising oxygen, sulphur, selenium and tellurium, and $m$ has a value not exceeding .1 and not less than .001. A homogeneous solid of this composition can be employed as the positive element of the pair of dissimilar thermoelectric materials, e.g., **86*a* and 86*b*** (FIG. 3).

A suitable negative element to cooperate with the aforesaid positive element desirably is composed of a homogeneous solid as described in the last-mentioned copending application, having the formula $Al_mT_{(1-m)}X$, where T represents one or more of the transition metals, and X and $m$ have the values previously given.

Other suitable positive and negative thermoelemental components comprise compounds having the formula $MZ_{(1\pm a)}$ where M represents an element from the group comprising chromium, iron, nickel, copper, cobalt, and manganese, Z represents an element selected from the group including sulfur, selenium, tellurium, arsenic, antimony, and bismuth, and $a$ has a positive value of less than 0.1. As described in the aforesaid Heikes and Johnston application, highly satisfactory thermoelectric elements can be prepared by combining a metal member fabricated from the group including copper, silver, copper base alloys, silver base alloys, and molybdenum, with an element of any of the aforementioned positive or negative elements.

When employing this latter arrangement, it is contemplated by the present invention that the casings 72 and 121 of alternate ones of each bundle 22 or 146 of fuel elements 48 or 120, respectively, can be replaced by a nonlaminated casing consisting essentially of the aforesaid metallic member. That is to say alternating ones of the casings 72 or 121 can be fabricated entirely from a metal selected from the group including copper, copper base alloys, silver, silver based alloys, and molybdenum.

The aforesaid positive and negative thermoelectric materials may be prepared as described in the aforementioned application of Heikes and Johnston or in their copending application entitled "Process for Producing Lithium Substituted Transition Metal Oxides and Members Prepared Therefrom," S.N. 580,856, filed April 26, 1956, and assigned to the assignee of the present application.

A pair of the aforesaid thermoelectric materials or other suitable materials of this nature are disposed respectively upon an adjacent pair of the fuel elements, for example 48*a* and 48*b* (FIG. 3), and are electrically connected in a manner presently to be described such that a cold junction of each pair of materials is formed at the exterior surfaces of the two elements 48*a* and 48*b* while a hot junction of these materials is formed at the internal surfaces of the fuel element casings 72 thereof. Accordingly, the hot junctions of the aforesaid thermoelectric pairs are disposed for heating by the fuel pellets 74, and the cold junctions thereof are arranged for cooling by the coolant fluid passing through the flow passages 56 on the fuel element assembly 20 (FIG. 3).

It will be appreciated that the block members 78 and 88 together with the fuel pellets 74 can be eliminated from the casing 72 and the latter can be employed as a tubular conduit for a heated fluid passing therethrough. Obviously, a number of such conduits each comprising the casing 72 can be arranged in a conventional manner to form a suitable heat exchanger or the like.

When employing the thermoelectric materials described in the last-mentioned copending application, a thermoelectric power of the order of 500 to 1000 microvolts per degree centigrade can be realized for each junction formed between the aforesaid dissimilar materials. These materials have the further advantage that both the ohmic resistivity and the thermal conductivity thereof are extremely low. Specifically, in certain types of such materials, the resistivity of the material is of the order of $10^{-2}$ ohm centimeters while the thermal conductivity is of the order of only 0.02 watts per centimeter per degree centigrade. It follows then that a relatively large temperature differential, that is to say in the order of 500° C. average, can be maintained between the hot and cold junctions of a thermopile formed with these materials and that a relatively large number of thermocouples can be employed therein without excessively increasing the ohmic resistance of the thermopile.

Returning now to FIGS. 3 and 4 of the drawings, in one example of the invention, the fuel elements 48 are secured or suspended between the end plates 38 and 40 of the fuel element assembly 20 and are secured at their respective extremities by means of fillister headed screws 100 inserted through a suitable aperture 102 in the end plate 38 or 40 and threaded respectively into the tapped holes 80 or 90 provided at each end respectively of the fuel element 48. In order to precisely position each of the fuel elements 48, each of the aforesaid apertures 102 are countersunk adjacent the inward openings thereof to receive the annular projections 82 or 92 (FIG. 1) of the fuel elements 48. These projections fit relatively closely within the aforesaid countersunk portions and thus the fuel elements 48 are precisely spaced from one another in order to provide the required flow passages 56 therebetween and in order to preserve the required spatial distribution of the nuclear fuel within the reactor core. The aforesaid flow passages 56 each communicate with the openings 52 in the flow nozzles 28, through a like number of aligned apertures 104 formed in each of the end plates 38 and 40 and the mounting plates 32, as better shown in FIG. 4 of the drawings.

In order to recess each of the heads of the screws 100 below the outer surface of each end plate 38 or 40, a recess 106 is formed about the outer opening of each of the apertures 102. In this arrangement, of the invention, the fillister headed screws 100 together with the conductive components of each fuel element 48 are insulated from like components of adjacent fuel elements by forming each of the end plates 38 and 40 from an electrically insulating material, for an example one of the aforementioned ceramics. In furtherance of this purpose, the heads of the screws 100 are depressed below the outer surfaces of the end plates as aforesaid in order to avoid contacting the metallic and conductive mounting plates 32 upon thermal expansion of the fuel bundle 22 longitudinally along the length of the tie rod sleeves 42. When insulated from one another in this fashion, the fuel elements 48 are connected in electrical series with one another, as better shown in FIG. 4 of the drawings, by means of electrically conductive straps 108 and 110. The conductive straps 108 and 110 likewise are depressed in the outer surface of the end plates 38 and 40, respectively, of the fuel bundle 22 by means of grooves 112 and 114 provided for this purpose and connecting certain ones of the depressions 106 surrounding the heads of the screws 100. The conducting straps 108 and 110 can be secured to adjacent pairs of the fillister headed screws 100 and thence to the thermoelectric fuel elements 48, in any convenient manner such as by spot welding the straps to the respective screw heads.

In this arrangement of the invention, it will be seen that a thermoelectric layer 86*a* of one of the fuel elements 48*a* (FIG. 3) is coupled through the outer casing layer 84*a* thereof through the associated fillister screw 100 and strap 108 (FIG. 4) to the outer casing layer 84*b* and thermoelectric layer 86*b* of an adjacent fuel element 48*b*. As indicated heretofore, the thermoelectric layers 86*a* and 86*b* comprise a pair of dissimilar thermoelements with a conductive material inserted at the cold junction thereof. Thus, the outer casing layers 84*a* and 84*b* couple the dissimilar thermoelectric layers 86*a* and 86*b* to form the cold junction therebetween since the casing layers are removed from the fuel material 74 and are exposed to the reactor coolant passing through openings 104 (FIG. 4).

In a similar manner, the thermoelectric layer 86*b* is coupled electrically through the inner casing layer 76*b* and associated fillister headed screw 100 and conductive strip 110 to the inner casing layer 76*c* and thermoelectric material 86*c* of still another adjacent fuel element 48*c*. This latter connection then forms the hot junction of the dissimilar thermoelectric layers 86*b* and 86*c* likewise having conductive material inserted at their hot junction. As noted heretofore, these hot junctions thus are arranged for convenient heating by the fuel pellets 74 by disposing the inner casing layers 76*b* and 76*c* substantially in contact therewith, while the cold junctions are arranged for convenient cooling by the reactor coolant fluid flowing through the passages 56 in heat-conductive relationship with the outer casing layers 84 of these fuel elements. In this example, the coolant can include a high boiling organic material such as phenyl, diphenyl or triphenyl, or a gaseous coolant such as carbon dioxide and the like. Any suitable one of these coolants or other coolant materials can be employed as long as it possesses the characteristic of electrical nonconductivity, to avoid shorting out the individual thermoelectric fuel elements 48.

In this manner, all of the fuel elements 48 of the assembly 20 are connected in electrical series, for an example, as illustrated more fully in FIG. 4 of the drawings. The end fuel elements of the electrical series are then connected electrically to the conductive mounting plates 32, respectively, by means, for an example, of a spring-biased electrode 116 inserted between the associated fillister headed screw 100 and the adjacent mounting plate 32. In this manner, electrical contact will be maintained despite thermally induced movements of end plates 38 and 40. The remainder of the nozzle assemblies 24 and 26, having likewise been fabricated from an electrically conductive material, then serves as a means for making electrical connection to the series-coupled fuel bundle 22. As indicated heretofore, these flow nozzle assemblies are electrically insulated from the tie rods 44 and other component parts of the assembly 20 and hence from one another. As a result the flow nozzles 28 thereof can be coupled in electric series as described in the aforementioned copending Shoupp application.

Turning now to FIGS. 5 to 7 of the drawings, the thermopile arrangement of the invention as shown therein is adapted for use with a plate type fuel element 120 for a nuclear reactor. Each of the plate type elements 120 is adapted to receive a layer of thermoelectric material in substantially the same manner as that described heretofore in connection with the rod type elements 48 of FIGS. 1 to 4 of the drawings. Accordingly, a pair of dissimilar thermoelectric materials are disposed on adjacent fuel elements 120 and are coupled in electrical series in the manner presently to be described in connection with FIGS. 8 to 9 of the drawings.

More specifically, each plate type element 120 comprises a relatively flat plate or sheet 122 of fissile isotope in this case provided desirably but not necessarily, in a metallic form for ease of fabrication. The plate or sheet 122 thus comprises, for an example, metallic U–235, U–233 or Pu–239 and a quantity of U–238 or thorium, or alloys thereof interse or with other non-fissile or nonfertile metals. Substantially surrounding the fuel plate 122 is an inner cladding layer 124. Secured to the inner cladding layer at the lower extremity thereof are a plurality of thickened members 125 of desirably circular configuration into each of which a hole 126 is drilled and tapped. Spaced from the inner cladding laver 124 is an outer cladding layer 128 likewise substantially surrounding the fuel plate 122 and terminating at the upper extremity thereof in a like number of thickened portions 130, likewise provided with a drilled and tapped hole 131. In this example three each of such thickened portions 125 and 130 are utilized and are spaced more or less uniformly along the upper and lower edges respectively, of the fuel element 120 in order to form flow passages 132 therebetween (FIG. 6) when a plurality of the plate type elements 120 are assembled in relatively close proximity.

Interposed between the inner and outer cladding layers 124 and 128 is a layer of thermoelectric material 134. The thermoelectric layer extends substantially continuously over adjacent portions of the inner cladding layer 124 and over the upper edge 136 of the fuel plate 122, in order to prevent direct electrical contact between the inner and outer cladding layers 124 and 128. As indicated heretofore in connection with FIGS. 1 and 2 of the drawings, any convenient method may be employed for applying the inner and outer cladding layers 124 and 128 and for applying the intermediate thermoelectric layer 134. The upper and lower thickened portions 130 and 125 can be secured to the outer and inner cladding layers 128 and 124, respectively, by brazing or welding or the like or by forming the thickened portions integrally with the aforesaid inner and outer cladding layers.

In this example of the invention, the fuel plate 122 may be formed with a thickness of approximately 50 mils and with a length and width of approximately 102 inches and six inches respectively. It will be appreciated that such dimensions are approximate and depend upon the size of the reactor core desired and likewise the number of such plates to be employed in each plate type fuel element assembly, one form of which is presently to be described. Such parameters can be readily calculated by those versed in the art with the aid of available information.

The inner and outer cladding layers 124 and 128 and the intermediate layer 134 can be formed with substantially the same respective thicknesses as enumerated previously for the equivalent cladding layers of the rod type fuel element 48 (FIGS. 1 and 2). The thickened portions 125 and 130 are formed with sufficient diameter such that they will not contact the similarly disposed thickened portions of an adjacent plate type fuel element when a plurality of such fuel elements are grouped to form the fuel element assembly of FIGS. 8 and 9, for example. In this example of the invention, a plurality of the plate type elements 120 are assembled such that a coolant flow passage 132 of approximately 150 mils in width is formed. Accordingly, for a fuel plate 122 of the dimensions noted and assuming that the cladding layers 124 and 128 of the fuel element 120 are each a selected thickness of 10 mils and that the intervening thermoelectric layer 134 is a nominal 10 mils in thickness, the diameter of the thickened portions 125 and 130 will be approximately 250 mils. Where larger thickened portions are required, it will be appreciated that the portions can be provided in a staggered array (not shown) relative to those portions of adjacent fuel elements.

Figure 8:
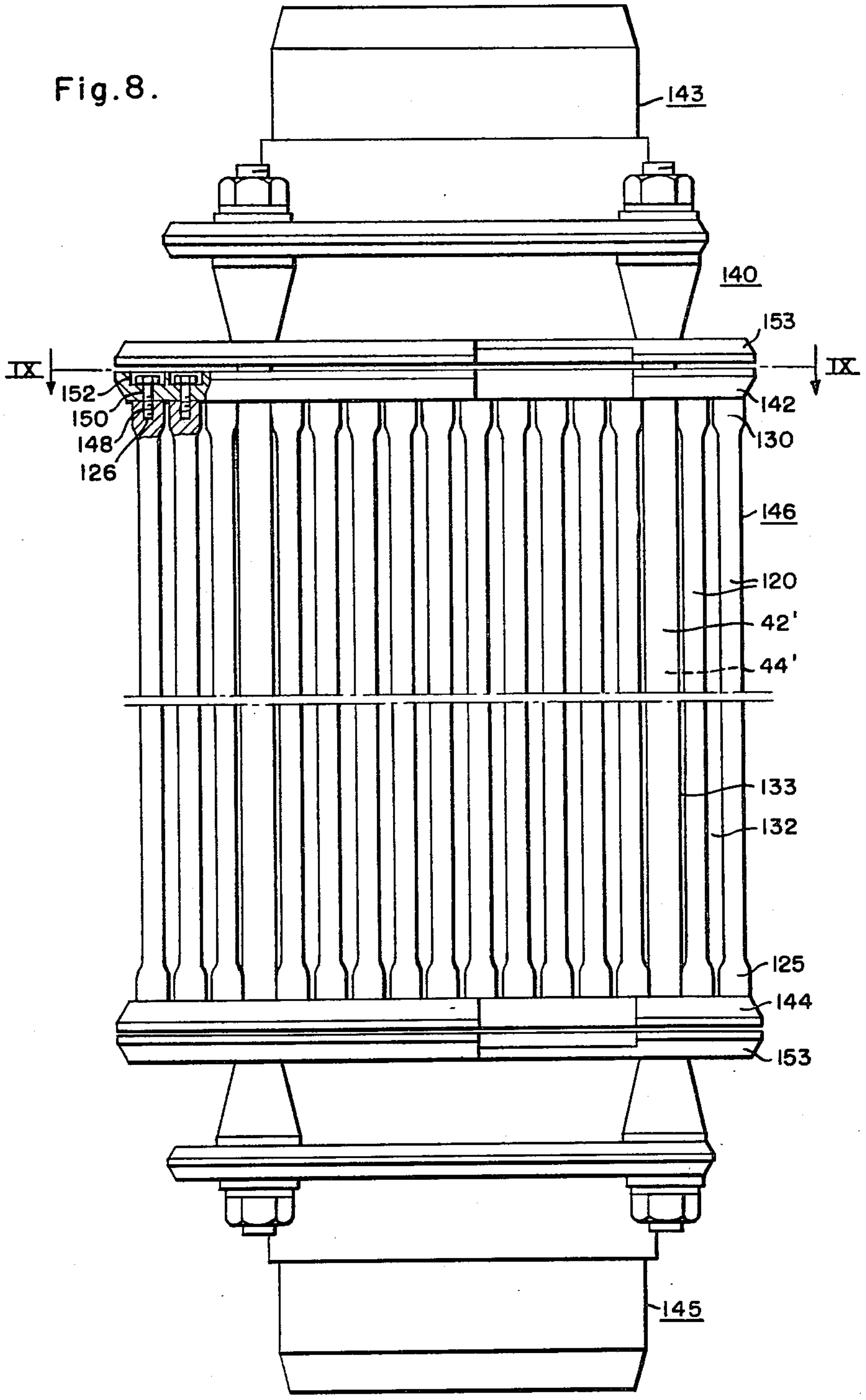
FIG. 8 is an elevational view of another form of nuclear fuel element assembly arranged according to the invention.
Figure 9:
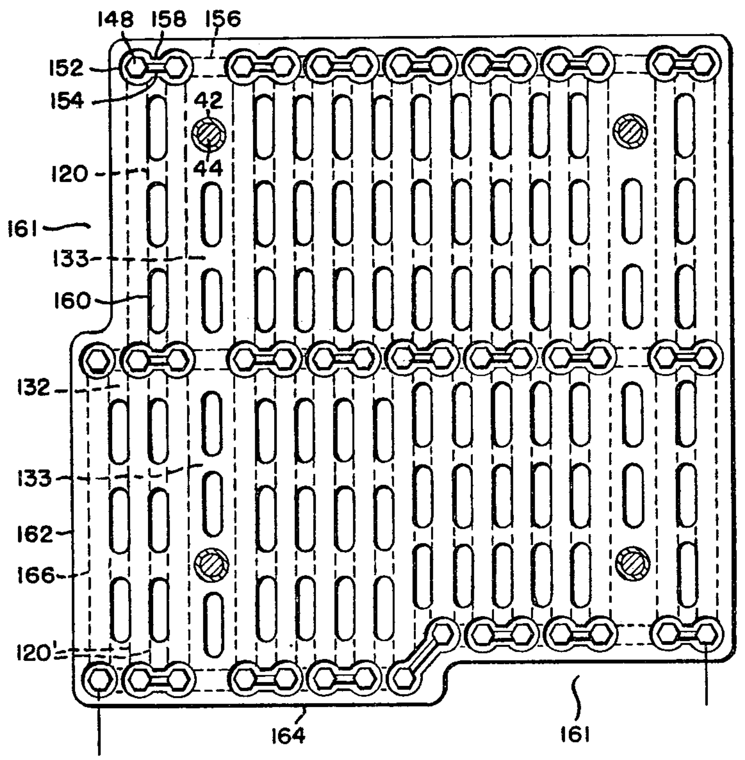
FIG. 9 is a top plan view of the fuel element bundle forming a part of the assembly of FIG. 8 and taken along reference lines IX—IX thereof.

Referring now to FIGS. 8 and 9 of the drawings, a plurality of such plate type fuel elements 120, with 17 being employed in this example of the invention, are mounted within a fuel element assembly 140. More specifically, the fuel elements 120 are mounted between a pair of end plates 142 and 144 which are slidably mounted upon a plurality of tie rods and insulating tie rod sleeves, which in this example are identical to the tie rod arrangement described heretofore in connection with FIGS. 3 and 4 of the drawings. Secured to the respective ends of the tie rod assembly are upper and lower nozzle assemblies 143 and 145. In this example of the invention, a fuel bundle 146 comprising the fuel elements 120 and their end plates 142 and 144 have substantially the same overall dimensions as that of the fuel bundle 22 of FIG. 3 and thus are adapted for use with flow nozzle assemblies similar to the assemblies 24 and 26 of FIG. 3 for mounting and suspension within a neutronic reactor core in the manner described previously.

The fuel elements 120 are each suspended in evenly spaced array between the end plates 142 and 144 such that their thickened portions 125 and 130 are not in contact with the exception of those fuel elements 120 which are adjacent the tie rods and tie rod sleeves 44′ and 42′. These latter-mentioned fuel elements are spaced to a greater extent to form a flow passage 133 of sufficient width to permit insertion of the tie rods in their insulating sleeves between these fuel elements. When assembled in this fashion, the fuel elements 120 are secured to the end plates 142 and 144, which are fabricated in this example from an electrical material such as one of the aforementioned ceramic materials, by means of fillister headed screws 148 inserted individually through suitably disposed apertures 150 in each of the end plates and are threaded into the tapped holes 126 and 131 of each of the thickened portions 125 and 130, respectively. As described heretofore in connection with FIGS. 3 and 4 of the drawings, a recess 152 is provided adjacent each of the apertures 150 in the end plates 142 and 144 in order to recess the heads of each of the fillister screws 148 below the outward surfaces respectively of the insulating end plates 142 and 144. Accordingly, electrical contact is prevented between the screws 148 and adjacent mounting plates 153 of the flow nozzle assemblies 143 and 145.

As better shown in FIG. 9 of the drawings, the fuel elements 120 are coupled in electrical series by means of conductive straps 154 and 156 secured in alternation respectively of the fillister screws 148, which are inserted through the end plates 142 and 144 respectively. Each of the conductive straps 154 and 156 is disposed in an accommodating groove 158 connecting the recesses 152 of each of the end plates 142 and 144 in an alternating array. In order to reduce the ohmic resistance of the aforesaid electrical connections, additional ones of the fillister screws 148 secured to each of the fuel elements 120 can be coupled in this fashion by the use of additional conductive straps 154 and 156, to form two or more parallel-series connections among the fuel plates 120.

In order to admit the flow of coolant to the spaces 132 and 133 formed between adjacent fuel elements 120, a plurality of aligned flow holes 160 are provided in each of the end plates 142 and 144 and in the adjacent mounting plates 153. In this example of the invention, three such flow holes of elongated configuration are employed. Obviously, however, any other convenient arrangement or shape of flow holes can be employed.

For the purpose of providing a passage for the insertion of a cruciform control rod into passages 161 formed between adjacent fuel element assemblies 140, step portions 162 and 164 are provided on each of two adjacent sides of the fuel bundle 146 and adjacent mounting plates 153. In order to accommodate the step portion 164 approximately half of the plate type fuel elements 120' are provided with a slightly greater width. On the other hand, the step portion 162 is accommodated by a narrower fuel element 166. The fuel element 166 is substantially similar to the fuel elements 120 or 120' with the exception that it is approximately one half the width of the latter-mentioned fuel elements and in this example is formed with only two thickened portions at each end thereof. This arrangement or a similar such arrangement is necessary in order to prevent vacancies within the fuel element assembly which vacancies otherwise would induce neutronic flux peaking within the core of the reactor, due to the accumulation of excess moderator therein.

In view of the foregoing, it is apparent that novel and efficient forms of heat exchanging means, including nuclear fuel elements and fuel element assemblies, have been discussed herein. These heat exchanging means are especially adapted for the application of thermoelectric materials thereto for the purpose of directly converting heat energy associated therewith into electrical power. Although the invention has been discussed primarily in connection with a neutronic power reactor, obviously the invention can be incorporated with other sources of heat and arranged in the form, for example, of a conventional heat exchanger. It is to be understood, therefore, that the foregoing descriptive and illustrative matter is exemplary of the invention and is not limitative thereof.

Therefore, numerous modifications of the invention will occur to those skilled in the art without departing from the spirit and scope of the invention. It is to be further understood that certain features of the invention can be employed without a corresponding use of other features.

Accordingly, what is claimed as new is:

1. In a fuel assembly for a neutronic reactor, the combination comprising a pair of spaced insulating end plates, a plurality of elongated fuel elements suspended between said end plates in a generally parallel spaced array, and means for securing the end portions of each of said fuel elements to said end plates respectively, each of said fuel elements having an inner cladding member mounted thereon and substantially enclosing said fuel element, an outer cladding member mounted adjacent to said inner cladding member but spaced outwardly therefrom, some of said fuel elements each having a thermoelectrically positive member mounted within said outer cladding member and conforming substantially to the space between said inner and said outer cladding members, said positive member being secured to said inner and said outer cladding members in electrically and thermally conductive relation, the remainder of said fuel members each having a thermoelectrically negative member mounted within its outer cladding member and conforming substantially to the space between said inner and said outer cladding members, said negative member being secured to said inner and said outer cladding members in electrically and thermally conductive relation, said outer cladding members substantially surrounding said inner cladding members respectively so as substantially to enclose said positive and said negative members respectively, said positive and said negative members spacing the confronting surfaces of the associated inner and outer cladding members so as electrically to insulate said members from one another save for conduction through said thermoelectric members respectively, and electrically conductive means for electrically connecting the inner cladding member of each fuel member to an inner cladding member of one of said fuel elements containing a relatively thermoelectrically dissimilar member and for connecting the outer cladding member of each fuel member to the outer cladding member of another of said fuel elements having a relatively thermoelectrically dissimilar member.

2. In a fuel assembly for a neutronic reactor, the combination comprising a pair of spaced insulating end places, a plurality of elongated fuel elements suspended between said end plates in a generally parallel spaced array, and means for securing the end portions of each of said fuel elements to said end plates respectively, each of said fuel elements having an inner cladding member mounted thereon and substantially enclosing said fuel element, an outer cladding member mounted adjacent to said inner cladding member but spaced outwardly therefrom, some of said fuel elements each having a thermoelectrically positive member mounted within said outer cladding member and conforming substantially to the space between said inner and said outer cladding members, said positive member being secured to said inner and said outer cladding members in electrically and thermally conductive relation, the remainder of said fuel members each having a thermoelectrically negative member mounted within its outer cladding member and conforming substantially to the space between said inner and said outer cladding members, said negative member being secured to said inner and said outer cladding member in electrically and thermally conductive relation, said outer cladding members substantially surrounding said inner cladding members respectively so as substantially to enclose said positive and negative members respectively, said positive and said negative members spacing the con- positive and said negative members spacing the confronting surfaces of the associated inner and outer cladding members so as electrically to insulate said members from one another save for conduction through said thermoelectric members respectively, the fuel elements having positive members being mounted in an alternating array with the remainder of said fuel elements, and electrically conductive means for electrically connecting the inner cladding members on adjacent pairs of said fuel members respectively and for electrically connecting the outer cladding members on other adjacent pairs of said fuel members to form a thermoelectric series therebetween.

3. An energy converter comprising a vessel, a plurality of generally tubular heat exchange casings, and means for supporting said casings in a generally parallel spaced array within said vessel, each of said casings being formed from an electrically conductive material, a thermoelectrically positive member mounted on some of said casings in electrically and thermally conductive relation therewith, said positive member having substantially the same configuration as that of said casing so as to cover substantially the entire adjacent surface of said casing, a cladding member mounted on said positive member in thermally and electrically conductive relation therewith, said cladding member having substantially the same configuration as that of said positive member so as to cover substantially the entire adjacent surface of said positive member, the remainder of said casings having a thermoelectrically negative member mounted thereon in thermally and electrically conductive relation therewith, said negative members conforming substantially to the adjacent surface of their associated casings so as to cover substantially the entirety of said surface, a cladding member mounted on each of said negative members in electrically and thermally conductive relation therewith, said second mentioned cladding members conforming substantially with the adjacent surfaces of said negative members so as to cover substantially all of said surfaces respectively, and circuit means for electrically connecting each of said casings and each of said cladding members to a casing and a cladding member respectively of others of said heat exchange members to form a thermoelectric series therebetween.

4. An energy converter comprising a vessel, a plurality of generally tubular heat exchange casings, and means for supporting said casings in a generally parallel spaced array within said vessel, each of said casings being formed from an electrically conductive material, a thermoelectrically positive member mounted on some of said casings in electrically and thermally conductive relation therewith, said positive member having substantially the same configuration as that of said casing so as to cover substantially the entire adjacent surface of said casing, a cladding member mounted on said positive member in thermally and electrically conductive relation therewith, said cladding member having substantially the same configuration as that of said positive member so as to cover substantially the entire adjacent surface of said positive member, the remainder of said casings having a thermoelectrically negative member mounted thereon in thermally and electrically conductive relation therewith, said negative members conforming substantially to the adjacent surface of their associated casings so as to cover substantially the entirety of said surface, a cladding member mounted on each of said negative members in electrically and thermally conductive relation therewith, said second mentioned cladding members conforming substantially with the adjacent surfaces of said negative members so as to cover substantially all of said surfaces respectively, the heat exchange members having positive members being mounted in alternating array with the heat exchange members having negative members, and circuit means for connecting adjacent pairs of said casings respectively and for connecting other adjacent pairs of said cladding members respectively to form a thermoelectric series throughout said alternating array.

5. A fuel assembly for a neutronic reactor, said assembly comprising a pair of spaced insulating end plates, means for supporting said end plates in spaced relation, a plurality of elongated fuel elements, and means for securing the ends of each of said fuel elements to said plates, respectively, each of said elements including an elongated generally tubular first cladding member closed at one end thereof, a quantity of fissile material inserted into said cladding member, a generally tubular thermoelectric member closed at one end, said cladding member being inserted open end first into said thermoelectric member and closely fitting therewithin so that said cladding member and said thermoelectric member are in thermally and electrically conductive relationship, a second generally tubular cladding member closed at one end, said thermoelectric member being inserted closed end first into said second cladding member and closely fitting therewithin so that thermoelectric member and said second cladding member are in thermally and electrically conductive relationship, said thermoelectric member spacing said first and said second cladding members so that they are electrically insulated from one another save through said thermoelectric member, the thermoelectric members of some of said fuel elements being relatively positive and the remainder of said thermoelectric members being relatively negative, circuit means for electrically connecting pairs of said first cladding members so that each pair thereof are associated with thermoelectrically dissimilar thermoelectric members to form hot thermocouple junctions therebetween, and circuit means for electrically connecting pairs of said second cladding members with each pair thereof associated with dissimilar thermoelectric members to form cold junctions therebetween, said circuit means connecting said hot and said cold junctions in thermoelectric series throughout said fuel assembly.

References Cited in the file of this patent

UNITED STATES PATENTS

| | | |
|---|---|---|
| 529,711 | Cox | Nov. 27, 1894 |
| 546,417 | Cox | Sept. 17, 1895 |
| 724,572 | Hall | Apr. 7, 1903 |
| 928,089 | Vokel | July 13, 1909 |
| 1,664,720 | Woodruff | Apr. 3, 1928 |
| 2,456,070 | Malek et al. | Dec. 14, 1948 |
| 2,734,344 | Lindenblad | Feb. 14, 1956 |
| 2,811,568 | Lloyd | Oct. 29, 1957 |
| 2,902,23 | Luebke et al. | Sept. 1, 1959 |

FOREIGN PATENTS

| | | |
|---|---|---|
| 618,508 | Great Britain | Feb. 23, 1949 |

OTHER REFERENCES

The Physical Review, vol. III, No. 6, Sept. 15, 1958, pages 1493–1496.

The British Journal of Applied Physics, vol. 8, 1957, pages 179–189.

TID–7515 (part 2), Aug. 1956, pages 197, 273, 292, 294.